INVENTORS
L. V. TRIGGIANI
M. G. SANCHEZ
G. E. ASHBY

BY

ATTORNEY

United States Patent Office 3,586,745
Patented June 22, 1971

3,586,745
METHOD OF PREPARING A FUEL PLATE CONTAINING DENSIFIED FUEL PARTICLES
Leonard Vincent Triggiani, Silver Spring, Moises Gali Sanchez, Severna Park, and George Elliott Ashby, Highland, Md., assignors to W. R. Grace & Co., New York, N.Y.
Filed Feb. 28, 1968, Ser. No. 710,708
Int. Cl. G21c 21/00
U.S. Cl. 264—.5                                    4 Claims

ABSTRACT OF THE DISCLOSURE

A process for improving the utility of the fuel-bearing phase of a dispersion type nuclear fuel plate, in which individual foils are impressed with cells of controlled dimension and shape in a close-packed array, and dense microspherical fuel particle containing the fissionable materials are inserted in the cells by vibration, compression, suction, or other means. The foils are then laminated to additional plates to yield a unitized fuel plate with the fuel particles dispersed uniformly throughout and with sufficient void space in each of the cells to take care of fission gases and any expansion in individual fuel particles.

---

Figure 1:
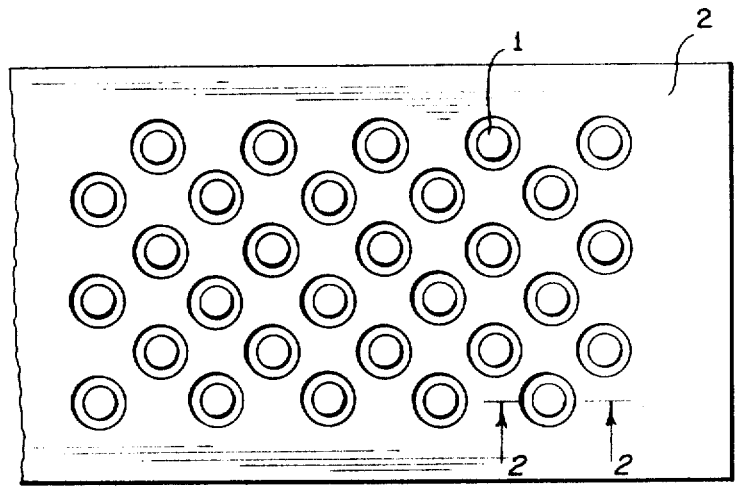

The use of heterogeneous fuels, the system in which the particles of fissile material are dispersed in or surrounded by a fuel free matrix is growing rapidly. This system provides a structure in which fuel-bearing particles are present as individual small cells of fuel, each encapsulated within a matrix. The resulting composite is more stable under radiation than comparable homogeneous fuel materials because the operating life is increased through localization of fission fragment damage.

In this system, the damage produced by fission fragments is restricted to the fuel-bearing particle and the coating material, if present, plus the surrounding matrix to a distance equal to the recoil range of the matrix material. In most solids, the recoil range is quite small, in the order of a few microns. Since this range is small, a fuel material can be designed in which the interparticle distance is greater than twice the recoil during irradation. A structural skeleton is thus provided that will maintain integrity as the fuel is consumed.

In one such system, a plate composed of zirconium, aluminum, stainless steel, zircalloy, graphite, beryllia, alumina, aluminum alloys, or other metals with fissionable material dispersed throughout has proved to be a reliable fuel form. Uranium dioxide has a high melting point, high density and has a stable uranium chemical form. The metal plates or non-metallic strips such as beryllia, graphite, or alumina have provided stability, corrosion resistance, adequate or superior heat transfer properties, a lack of reactivity with $UO_2$ and other fissionable fuel particles, an inherent strength at high temperature and neutrone fluxes. In addition, the properties of these metals and non-metals have made them potentially desirable as matrix materials for providing fuel loadings in the desired range.

The prior art methods of fabrication of dispersion fuels embody blending coated particles with a powdered precursor of the matrix material. Mixing in this manner results in a non-uniform distribution of the spherical fuel material and in the matrix material. This non-uniformity is a serious drawback and is especially marked when the spherical fuel particles and the matrix precursor powder are of widely different particle sizes and shapes. Non-uniformity is also a serious problem when it is desirable to mix the fuel with additional components such as burnable poisons, coated boron carbide particles, for example. Even under the most ideal of mixing conditions, a certain amount of non-uniformity of particle distribution is inherent in this method owing to the wide distribution of sizes of the spherical fuel materials themselves as obtained by classical ceramic processing techniques.

During the mixing operation, fuel particles sometimes come in violent contact with each other. This leads to rupture of the particle coating and release of the fuel material into the matrix precursor. This may lead to rejection of the finished fuel element for poor quality. The released fuel would contaminate the matrix in the final fuel element and result in hot spot formation, damage to the matrix material and fission product release. Often such defects are undetected prior to loading a fuel element in a reactor. Fuel element failure during reactor operation leads to contamination of the coolant, the reactor environment and eventual reactor shutdown.

During the mixing operation, and the pressing and compaction operations, which follow, the geometric non-uniformity of particle distribution and particle sizes and shapes often leads to violent collision between spherical particles which result in flattening and distention of the coated particles in such a manner as to produce stringering and micro cracks in the final fuel element. This behavior leads to the formation of hot spots in a reactor and also to the formation of cracks in the fuel element which result in fission product contamination of the fuel element matrix and the fuel element environment.

The introduction of microspheres, such as are described in U.S. Pat. 3,331,785, has resulted in substantial improvements in fuel technology. This application and copending applications Ser. Nos. 710,707 and 710,709, filed of even date herewith, cover processes for utilizing these microsphere materials in fuel plates.

The microspheroidal particles described in U.S. Pat. 3,331,785, have unique physical and chemical properties that make them particularly desirable in the preparation of fuel plates. Although "microspheres" have been prepared by other described techniques, the particles prepared by these techniques do not have the desirable set of chemical and physical properties necessary for preparation of the fuel plates of our invention.

The spheres prepared according to the process described in U.S. Pat. 3,331,785, are highly spherical and can be produced in very closely controlled size ranges. Since this is the case, an array of cells of regular size and shape can be fabricated to accommodate these spheres. This is not possible where the particles have irregular sphericity and vary widely in size.

Since few of these spheres vary from sphericity, they can be more easily coated than poorly shaped particles. The coatings on these particles are uniform and have an excellent retentivity of fission products. Because the surface texture is smooth, the coatings are strong and have no tendency to weaken durnig fabrication or use in a reactor.

One of the principle problems encountered in the prior art microspheres characterized by poor sphericity and irregular surface results from the tendency of uranium to migrate through the coating at points where surface irregularities exist.

In the classical process of sphere formation, high temperatures are required to spheroidize the irregular shaped particles and to achieve composition uniformity or solid solution in binary or multi-component systems. These high temperatures are incompatible with low density (50% to 80% of theoretical). In the process described in the 785 patent, solid solution and spheroidization is achieved in materials that have been treated at temperatures of 80 to 100° C.

Figure 2:
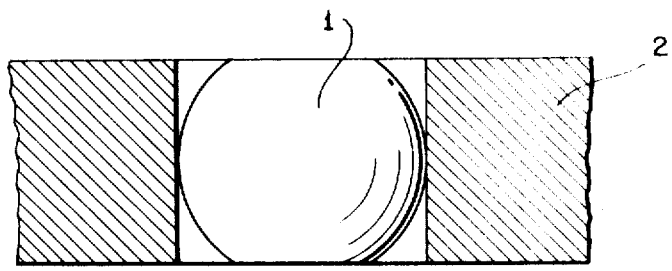
Figure 3:
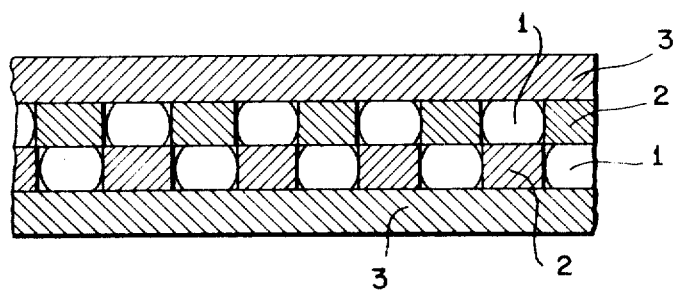

This application is restricted to that special case where the microspherical nuclear fuel particles have densities of greater than 90% of theoretical. The preparation of these fuel plates require a special technique in that it is desirable to allow void space in the individual cells to take care of fission product release and swelling of the fuel particles without damage to the cells. This is accomplished by special bonding techniques and special rolling techniques after the fuel plates have been assembled. In order that the character of the individual foils and fuel plates may be better understood, reference should be had to the sheet of drawings in which the characteristics of the fuel plate and individual particles are illustrated. In FIG. 1, there is illustrated a top view of an individual foil after compression. This view shows the microspheres 1 in the plate 2 and shows the void space around each of the individual particles. FIG. 2 is a cross section of FIG. 1 along the line 2—2 and shows a section of the individual foil. The microsphere 1 is positioned in the cell in the manner such that void space is allowed for collection of gases and other fission products and to allow for expansion of the microsphere 1. The position of the individual mircosphere in the foil 2 is shown in this drawing. FIG. 3 is a cross sectional view of one embodiment of a finished fuel plate. The fuel plate has upper and lower foils 3. The arrangement of the microspheres 1 in relationship to the unperforated sections of the fuel plate 2 are shown in this figure.

It is an object of this invention to prepare fuel elements in the form of plates having void space within the cell to accommodate fuel particle swelling.

It is a further object of this invention to prepare fuel elements in the form of plates having void space within the cell for fission product collection.

For purposes of this application, the spaces in the foils occupied by the microspheroidal fuel elements are designated cells. Each of the cells has a critical dimension. The diameter of the cell is the same as the thickness of the foil and the diameter of the microsphere before compression of the individual foil. This provides a uniform distance between the spheres in all directions.

The most advantageous arrangement of these cells and the fuel plate is the close-packed array. In this system, the cells in individual plates are positioned in a manner such that when the plates of the metals being used as a matrix are assembled, the fuel microspheres are in contact with the matrix metal at the top, at the bottom, as well as at the sides of the individual cells. The critical dimension of the cells is such that each of these fuel particles before compression of the individual foil are separated from the adjoining fuel particle by distance equal to the diameter of the fuel particle. FIG. 3 shows this arrangement graphically.

The first step of our process is the selection of a fuel matrix material. The plates can be metals such as aluminum, aluminum alloys, stainless steel, various Zircalloy materials, as well as zirconia metal. In addition, the matrix material may be essentially non-metallic and made up of graphite, beryllia or alumina.

After the matrix material has been selected, the next step in the process is the impression of the individual cells in each of the plates. This may be accomplished by any suitable technique such as drilling, forging, casting, stamping, or etching. One of the problems encountered in drilling is the presence of burrs in the finished product. This problem can be overcome by the technique known as double drilling where the drill is run into the plate and the plate reversed and the drill passed through the plate from the reverse side. The technique eliminates the burrs in the finished cells.

Another particularly convenient method of preparing these plates is the etching technique, particularly when the plate used to prepare the matrix material is a low cost metal that reacts vigorously with mineral acid. In this technique, the plate, such as an aluminum plate, for example, is covered with a plastic material. The plastic is disintegrated in a definite pattern using a light source, for example, and the metal dissolved away from the areas not having a plastic coating by an acid or other similar etchant. In the final step of this process, the etchant is washed away, the plastic removed, and the plate is then ready for loading and assembly into the fuel element.

In the next step of the process, the microspheres are positioned in the individual plates. This loading can be accomplished by vibration, pressing, or any other suitable means.

In the last step of the process, the individual foils making up the fuel plates are bonded together.

Since it is generally desirable to exclude air from the space in the cells, particularly in this application where the fuel particles have a density of greater than 90% theoretical and the void space surrounding the individual particles is to be utilized for expansion of the fuel particles and retention of fission gases, the bonding is most advantageously done under vacuum or in the presence of an inert gas, such as nitrogen, helium, argon, etc. The plates are assembled and bonded by pressing or some other means that allows retention of residual void space in each of the cells.

The individual fuel particles that are commonly designated "microspheres" and as described in U.S. Pat. 3,331,785, have diameters generally less than about 500 microns. Our novel process is also applicable for use with fuel particles that have diameter in excess of 1,000 microns as well. The special techniques required for preparing the fuel plates containing these larger sized particles are described in certain of the appended examples.

Our invention is further illustrated by the following specific, but non-limiting examples.

EXAMPLE I

A fuel plate was prepared by drilling four stainless steel foils having a thickness of 6 mils to provide a series of cells 6 mils in diameter. The four plates were drilled and assembled in a manner such that in the final assembly the fuel was distributed in the foils in a close-packed array. The overall dimensions of this part of the assembly were ½″×⅝″.

The fuel-bearing foils were loaded with urania microspheres that contained an alloying agent. The spheres were coated with niobium to a thickness of 8 microns.

Foils, 12 mils in thickness, were positioned at the top and bottom of the core assembly. The foils were bonded by the hot pressing technique to prepare a simulated fuel plate.

EXAMPLE II

A series of punches were assembled in a holder in a manner such that they gave the configuration of a series of rows. Each of the punches had a punch head diameter of 6 mils.

This assembly was mounted in a punch press and used to stamp out holes in a stainless steel foil 6 mils thick to prepare the cells for the fuel-bearing plates.

EXAMPLE III

This example illustrates the preparation of a fuel plate using microspheres having a diameter of 900 to 1,000 microns. The critical dimension in this case is thus 900 to 1,000 microns.

Foils were prepared to accommodate fuel particles 900 to 1,000 microns in diameter. The individual foils were 900 to 1,000 microns thick and were impressed with holes 900 to 1,000 microns in diameter by drilling to form the individual cells.

The fuel plates were loaded with dense urania microspheres 900 to 1,000 microns thick having a coating of niobium 8 microns thick. The assembly was completed by hot pressure bonding foil 2,000 microns thick to the top and bottom of the assembly.

EXAMPLE IV

This example illustrates the preparation of a graphite fuel plate wherein the critical dimension is 5 mils.

A graphite fuel plate was prepared using the techniques described above.

The fuel-bearing foils were 5 mils thick. The outer foils were 10 mils thick. The cells in the plate were loaded with urania microspheres coated with niobium metal to a thickness of 8 microns.

EXAMPLE V

This example illustrates the preparation of a graphite fuel plate wherein the fuel particles are uranium carbide particles and the critical dimension is 5 mils.

A plate was prepared using the materials and techniques described in Example IV. The cells in the graphite foils were loaded with uranium carbide coated with pyrolytic carbon to a thickness of 25 microns.

EXAMPLE VI

This example illustrates the preparation of a graphite fuel plate where the fuel is present as particles 40 mils in diameter that are not coated.

A fuel plate was prepared using the techniques and material described in Examples V and VI except that the graphite foils containing the fuel-bearing cells were 40 mils thick. The foils were impressed with holes 40 mils in diameter by drilling. The cells were loaded with uncoated urania particles 40 mils in diameter.

What is claimed is:

1. A process for directly forming a fuel assembly suitable for use in a nuclear reactor which comprises perforating a foil of zirconium, aluminum, stainless steel, Zircalloy, aluminum alloys, graphite, alumina, or beryllia, to form a series of cells of controlled size and dimension inserting sintered uniformly sized microspheres of fissile material having a density of greater than 90 percent of theoretical in said cells, bonding by pressing said foils to additional fuel-bearing foils and to unperforated foils positioned at the top and bottom of the assembly, in a manner such that each cell contains sufficient void space to collect fission products and allow for swelling of the fuel particles, and recovering the product assembly.

2. The process according to claim 1 wherein the microspheres are of a fissile material selected from the group consisting of $U^{235}$, $PU^{239}$, and $U^{233}$ and have a size in the 50 to 750 micron range.

3. The process according to claim 1 wherein the microspheres are of a fissile material selected from the group consisting of $U^{235}$, $Pu^{239}$, and $U^{233}$ and have a size in the 900 to 1200 micron range.

4. The process according to claim 1 wherein the fissile fuel particles are positioned in said plate in a close-packed array.

References Cited

UNITED STATES PATENTS

| | | | |
|---|---|---|---|
| 2,491,320 | 12/1949 | Koontz | 264—.5X |
| 2,996,443 | 8/1961 | Schaner | 176—75 |
| 3,008,884 | 11/1961 | Schippereit et al. | 176—86 |
| 3,097,152 | 7/1963 | Walker | 176—75X |
| 3,103,478 | 9/1963 | Kooistra | 176—86 |
| 3,141,227 | 7/1964 | Klepfer et al. | 176—86X |
| 3,270,412 | 9/1966 | Vordahl | 29—472.3 |
| 3,368,261 | 2/1968 | Pauls | 29—480X |

REUBEN EPSTEIN, Primary Examiner

U.S. Cl. X.R.

29—191.2, 472.3; 176—68, 75